United States Patent
Kuhl et al.

(10) Patent No.: US 10,641,366 B2
(45) Date of Patent: May 5, 2020

(54) ENGINE BRAKING SYSTEM FOR CONTINUOUSLY VARIABLE TRANSMISSION

(71) Applicant: Polaris Industries Inc., Medina, MN (US)

(72) Inventors: Amery D. Kuhl, North Branch, MN (US); Anthony J. Ripley, Ham Lake, MN (US); Stephen L. Nelson, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 362 days.

(21) Appl. No.: 15/388,221

(22) Filed: Dec. 22, 2016

(65) Prior Publication Data
US 2018/0180141 A1    Jun. 28, 2018

(51) Int. Cl.
*F16H 9/18*         (2006.01)
*F16H 55/56*      (2006.01)
(Continued)

(52) U.S. Cl.
CPC ............ *F16H 9/18* (2013.01); *F16H 55/56* (2013.01); *F16H 55/563* (2013.01); *F16H 61/66245* (2013.01); *F16H 61/21* (2013.01)

(58) Field of Classification Search
CPC .......... F16H 9/18; F16H 55/56; F16H 55/563; F16H 61/21; F16H 61/662
See application file for complete search history.

(56) References Cited

U.S. PATENT DOCUMENTS 3,759,111 A * 9/1973 Hoff .................... F16H 55/563
474/14
4,102,214 A   7/1978 Hoff
(Continued)

FOREIGN PATENT DOCUMENTS

EP        2767736       8/2014
WO   WO2016099770    6/2016

OTHER PUBLICATIONS

Patent Cooperation Treaty, International Search Report and Written Opinion, PCT/US2017/065511 to Polaris Industries Inc., dated Oct. 18, 2018; 17 pages.

*Primary Examiner* — William E Dondero
*Assistant Examiner* — Robert T Reese
(74) *Attorney, Agent, or Firm* — Faegre Drinker Biddle & Reath LLP

(57) ABSTRACT

A continuously variable clutch (CVT) is disclosed which is operable in a first direction to transfer power from a power source to ground engaging members of a vehicle, and in a second direction where the ground engaging members brake and/or drive the engine. The CVT has a braking assembly having a thrust member positioned over a drive clutch shaft and adjacent an outer sheave of the drive clutch. A flanged sleeve is operatively coupled to the drive clutch shaft and generally positioned intermediate the inner and outer sheaves of the drive clutch, with a portion of the flanged sleeve being adjacent the thrust member. The flanged sleeve is fixed relative to the drive clutch shaft when operating in the first direction and is cooperable with the thrust member to move the flanged member axially relative to the drive clutch shaft and towards the inner sheave when operating in the second direction.

30 Claims, 14 Drawing Sheets

(51) Int. Cl.
*F16H 61/662* (2006.01)
*F16H 61/21* (2006.01)

(56) References Cited

U.S. PATENT DOCUMENTS

| | | |
|---|---|---|
| 6,149,540 A | 11/2000 | Johnson |
| 6,811,504 B2 | 11/2004 | Korenjak |
| 2002/0033295 A1 | 3/2002 | Korenjak |
| 2002/0119846 A1* | 8/2002 | Kitai .................. F16H 55/56 474/14 |
| 2011/0092325 A1* | 4/2011 | Vuksa .................. F16H 9/18 474/14 |
| 2014/0235382 A1* | 8/2014 | Tsukamoto ........... F16H 63/067 474/14 |
| 2015/0011344 A1* | 1/2015 | Ebihara .................. F16H 9/18 474/8 |

* cited by examiner

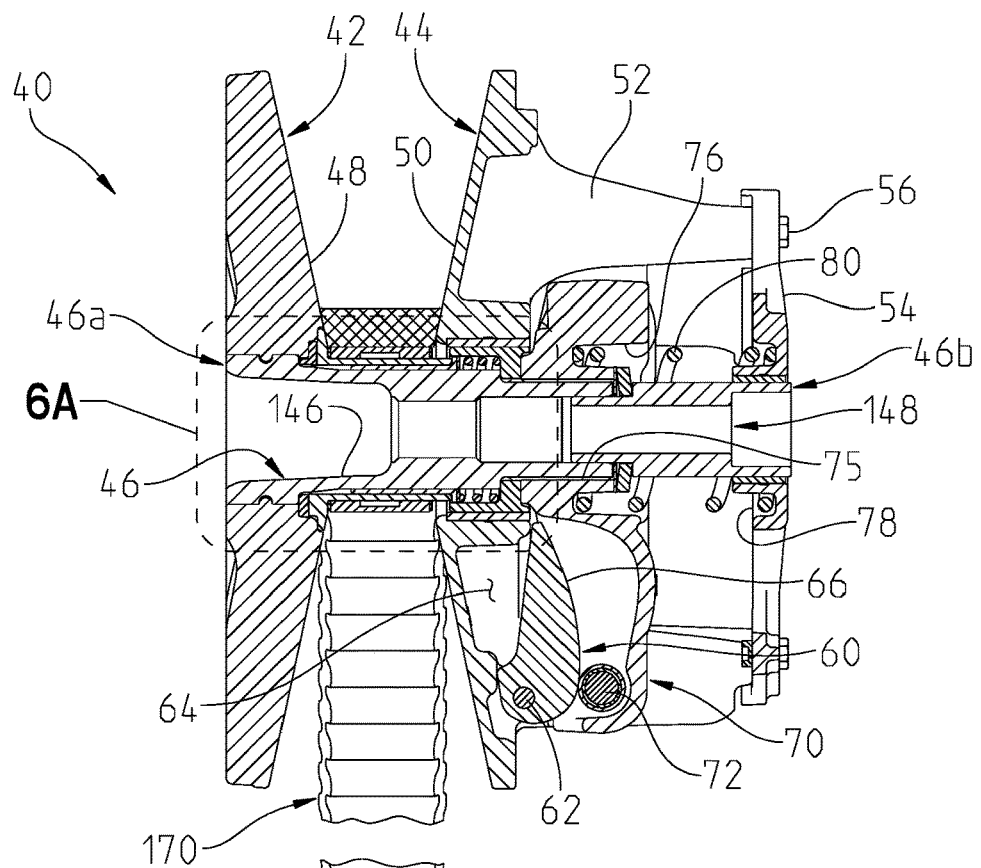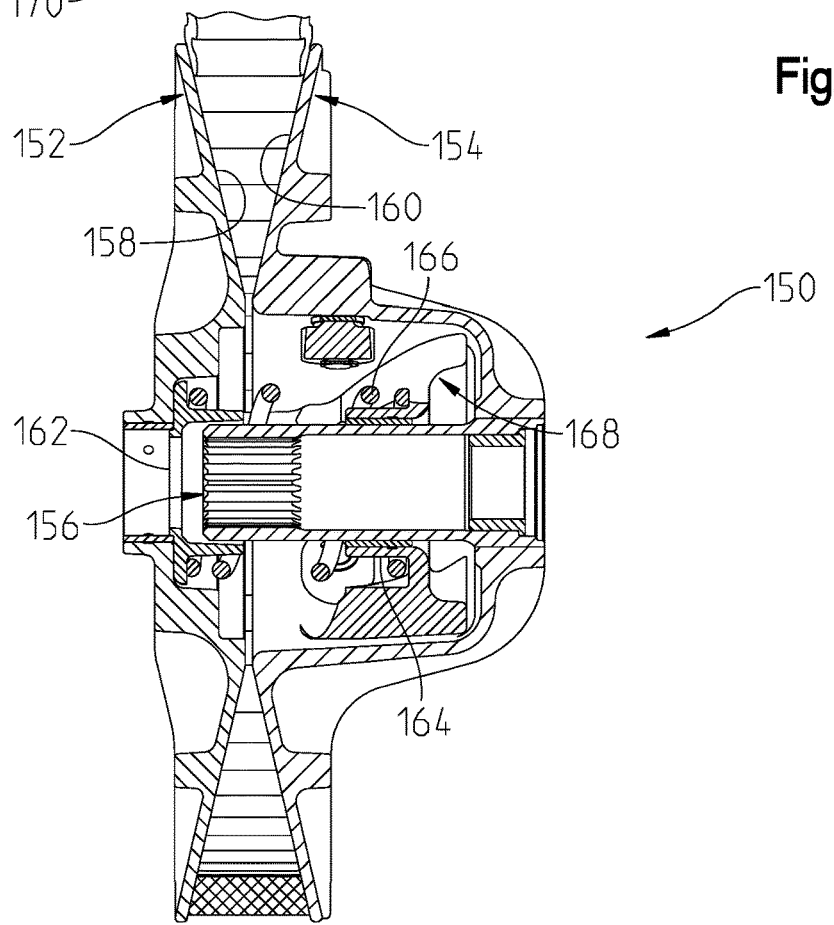
Fig. 6

ENGINE BRAKING SYSTEM FOR CONTINUOUSLY VARIABLE TRANSMISSION

FIELD

The present invention relates generally to a continuously variable transmission and in particular to a continuously variable transmission (CVT) for a vehicle.

BACKGROUND AND SUMMARY

CVTs are known. CVTs include a driven clutch operatively coupled to a drive clutch through a belt. The drive clutch is coupled to an input shaft of the CVT and the drive clutch is coupled to an output shaft of the CVT. As is known in the art, as the rotation speed of the input shaft varies, the drive clutch, the driven clutch, and the belt cooperate to vary the rotation speed of the output shaft. Typically, the drive clutch, the driven clutch, and the belt are positioned within a housing and ambient air is moved through the housing to assist in cooling the drive clutch, the driven clutch, and the belt.

It is commonplace for the CVT to have input from a power source such as an internal combustion engine and output to a geared transmission. Examples of CVT applications in vehicles may be seen in any of the following disclosures, namely: U.S. Pat. Nos. 8,827,028; 8,827,019; and US Publication 20150061275, the subject matter of which is incorporated herein by reference. An example of a CVT is shown in US Publication 20160061314, the subject matter of which is incorporated herein by reference. A vehicle for use with the present CVT is more fully described in our application (Ser. No. 62/438,267) filed on Dec. 22, 2016.

The present disclosure relates to CVTs. By way of example, the present disclosure relates to systems and methods to allow the CVT to brake the vehicle, and/or start the engine through the CVT by driving the wheels of the vehicle.

In an exemplary embodiment of the invention, a CVT includes a drive clutch having inner and outer sheaves rotatably coupled to a drive clutch shaft and a driven clutch having inner and outer sheaves rotatably coupled to a driven clutch shaft. The CVT further includes a one-way clutch; a flanged sleeve operatively coupled to the drive clutch shaft and generally positioned intermediate the inner and outer sheaves of the drive clutch, with the on-way clutch positioned over the sleeve. The flanged sleeve is rotatably fixed relative to the drive clutch shaft when operating in a first direction and being moveable axially relative to the drive clutch shaft and towards the outer sheave when operating in a second direction.

In another embodiment of the invention, a CVT comprises a drive clutch having inner and outer sheaves rotatably coupled to a drive clutch shaft and a driven clutch having inner and outer sheaves rotatably coupled to a driven clutch shaft. The CVT further comprises a thrust member positioned over the drive clutch shaft and adjacent the inner sheave of the drive clutch; and a flanged sleeve operatively coupled to the drive clutch shaft and generally positioned intermediate the inner and outer sheaves of the drive clutch, with a portion of the flanged sleeve being adjacent the thrust member. The flanged sleeve is rotatably fixed relative to the drive clutch shaft when operating in a first direction and being cooperable with the thrust member to move the flanged member axially relative to the drive clutch shaft and towards the outer sheave when operating in a second direction.

In another embodiment, a continuously variable clutch (CVT) comprises a drive clutch having inner and outer sheaves rotatably coupled to a drive clutch shaft; and a driven clutch has inner and outer sheaves rotatably coupled to a driven clutch shaft. One of the sheaves has a helix fixed to the sheave; the helix having helical surfaces, and the other of the sheaves having engagement members cooperating with the helical surfaces to effect movement of the two sheaves relative to each other. The one sheave is comprised of a first material having a density lower than 4 gr/cc and the helix is comprised of a second material having a density greater than 4 gr/cc.

The above mentioned and other features of the invention, and the manner of attaining them, will become more apparent and the invention itself will be better understood by reference to the following description of embodiments of the invention taken in conjunction with the accompanying drawings. These above mentioned and other features of the invention may be used in any combination or permutation. The invention is particularly intended for use with Powersports vehicles, such as ATVs, snowmobiles, utility vehicles and the like, but is useable with almost any vehicle.

BRIEF DESCRIPTION OF THE DRAWINGS

FIG. 6 illustrates a cross sectional view of the drive and driven clutches of the CVT of FIG. 1 at a low vehicle speed;

BRIEF DESCRIPTION OF THE DRAWINGS

Figure 1:
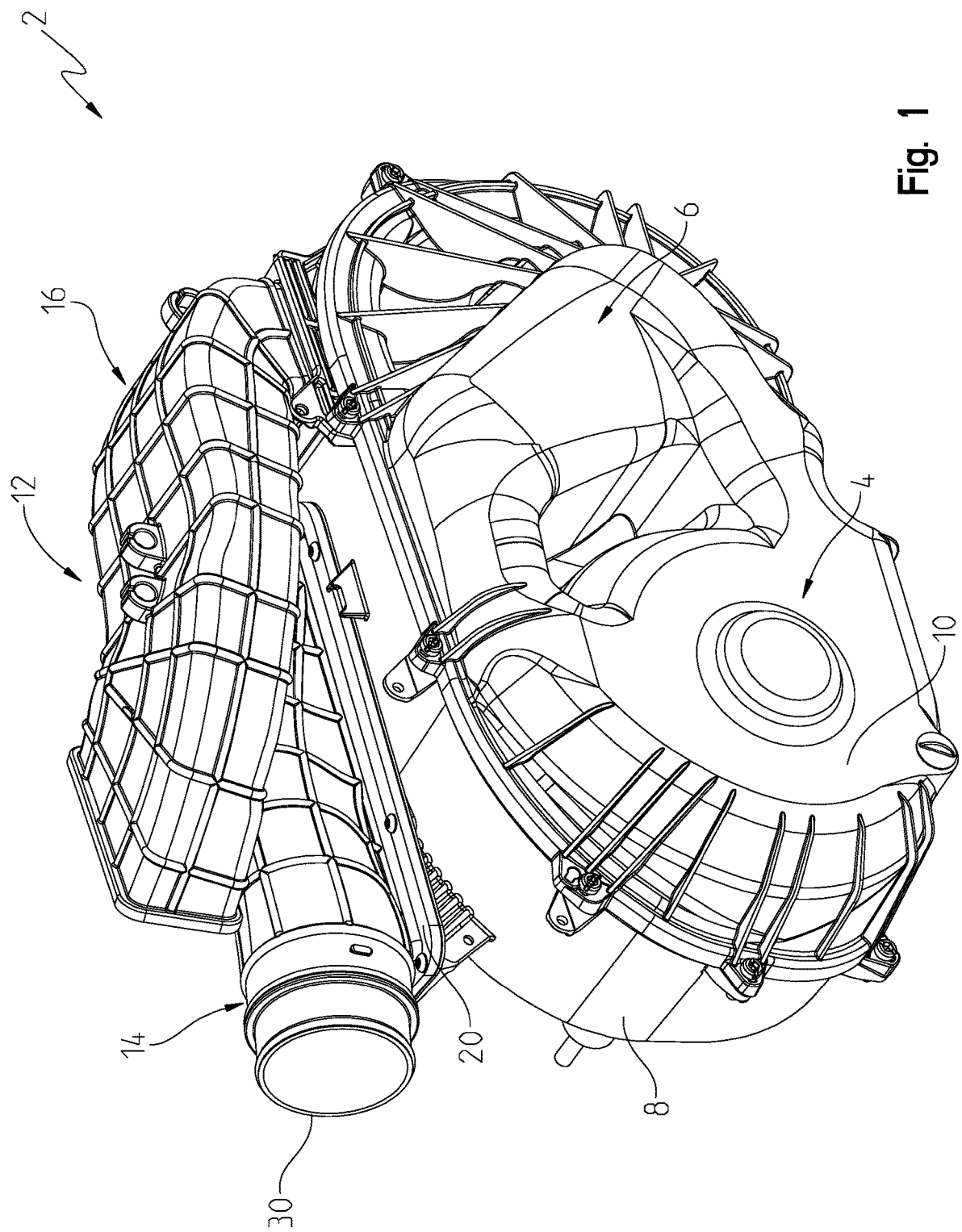
FIG. 1 illustrates a front perspective view of an exemplary CVT.
Figure 2:
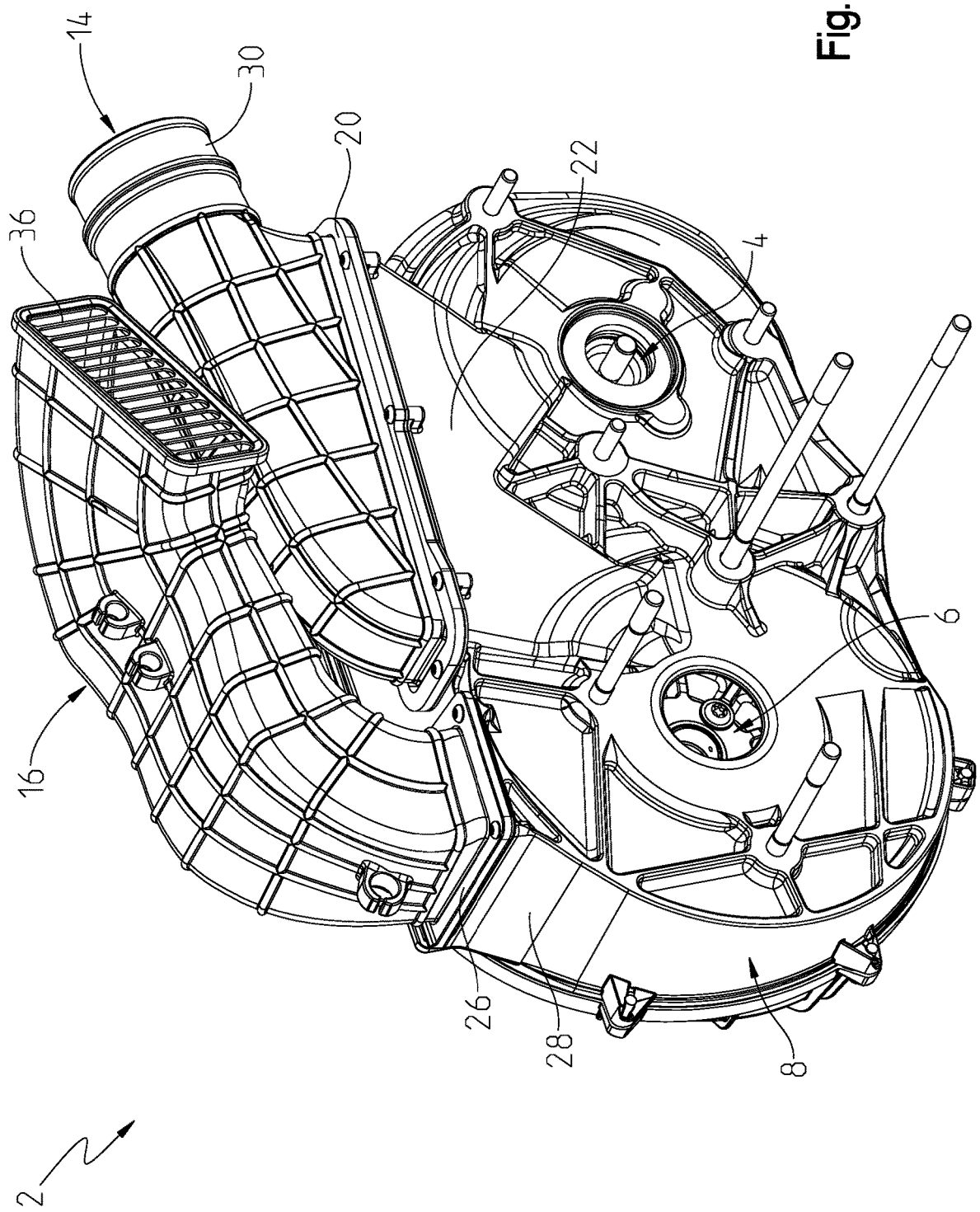
FIG. 2 illustrates a rear view of the CVT of FIG. 1.

With reference first to FIGS. 1 and 2, the assembled CVT is shown at 2 which includes a drive portion 4 and a driven portion 6 as more fully disclosed herein. The CVT 2 includes a housing 8 and a cover 10 which couples to the housing and encloses the CVT component. The present CVT housing 8 and cover 10 are more fully described in our application (Ser. No. 15/388,106) filed on Dec. 22, 2016.

The CVT includes a cooling assembly 12 which includes an intake duct 14 and an exhaust duct 16. Intake duct 14 includes a flange 20 which couples to a top portion 22 (FIG. 2) of housing 8, whereas exhaust duct 16 includes a flange 26 which couples to a portion 28 of housing 8. As is known in the art, an intake hose (not shown) would be coupled to an inlet 30 of intake duct 14 to draw cool and clean air into the CVT for cooling purposes. Exhaust duct 16 includes a discharge port at 36 which discharges the heated air from the CVT onto and towards an engine of the vehicle.

With reference now to FIG. 6, the drive portion 4 and driven portion 6 of the CVT 2 will now be described in greater detail. The drive portion 4 includes a drive clutch 40 having an inner and fixed sheave 42 and an outer and movable sheave 44. Inner sheave 42 couples to a two-piece shaft 46 to which outer sheave 44 is movably coupled, as described further herein. Two-piece shaft 46 includes shaft portion 46a and 46b. Inner sheave 42 includes an inclined contact surface 48 and outer sheave 44 includes an inclined and contact surface 50. Outer sheave 44 further comprises extending webs at 52 to which an outer plate 54 is coupled by way of fasteners 56. Centrifugal weights 60 are coupled to the outer sheave 44 by way of pins 62 coupled to webbed walls 64 of outer sheave 44. It should be appreciated that multiple centrifugal weights may be positioned at various angular positions of the outer sheave although only one is shown in FIG. 6 due to the location of the cross-sectional view.

Drive clutch 40 also includes a roller housing or "spider" at 70 to which a roller 72 is coupled where the roller 72 rolls against arcuate cam surface 66 of centrifugal weight 60. Housing 70 is fixed relative to shaft portion 46a by splines 74 (FIG. 5) which couple to complementary splines on an inside diameter 75 of housing 70 (FIG. 6). A compression spring 80 is positioned intermediate roller housing 70 and outer plate 54 which spring loads inner sheave 44 into the position shown in FIG. 6. As shown, roller housing 70 includes a channel 76 to receive a portion of compression spring 80 whereas outer plate 54 includes a channel at 78 to receive the opposite end of compression spring 80.

Figure 3:
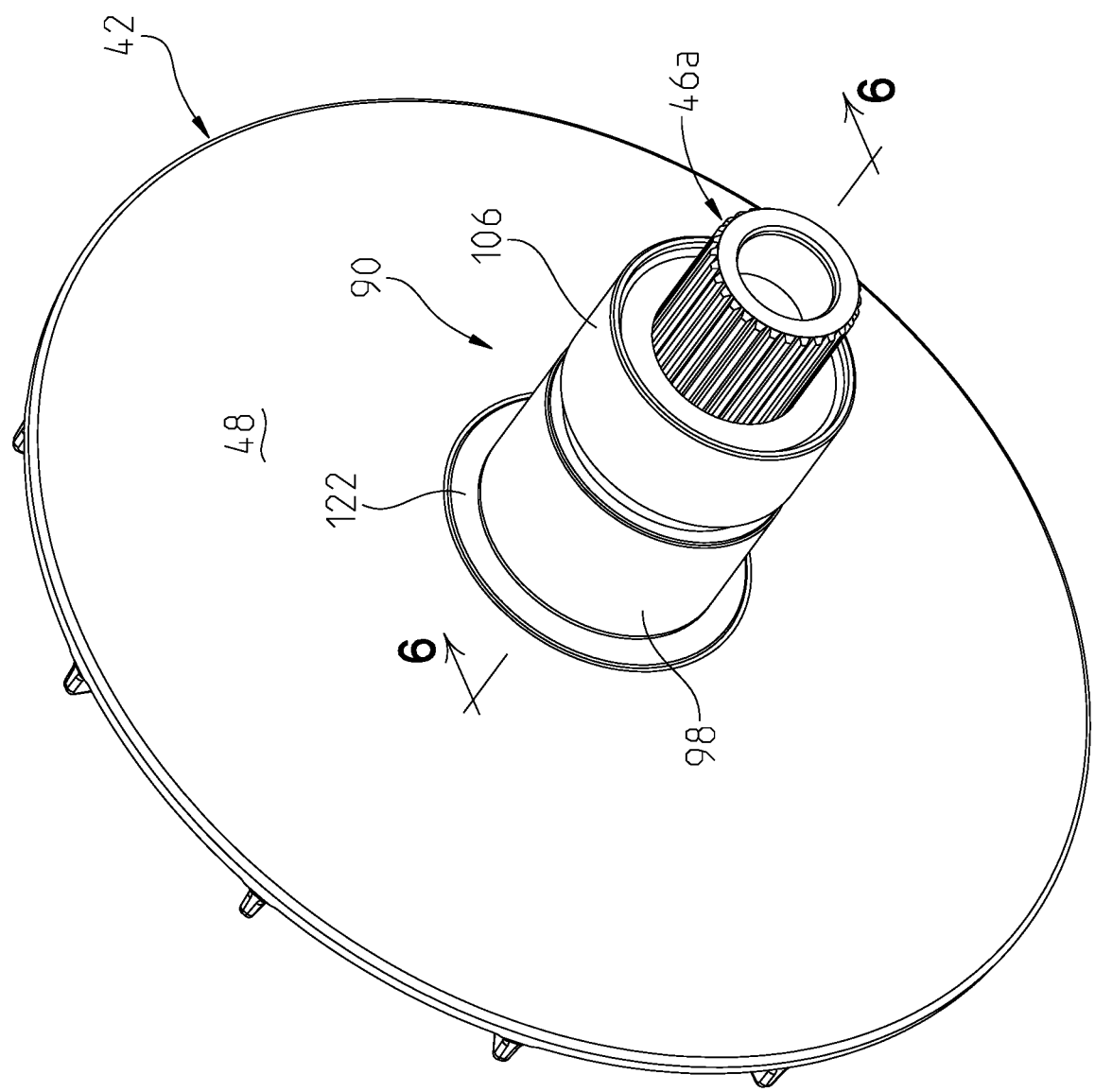
FIG. 3 illustrates a perspective view of the fixed sheave assembly of the drive clutch for the CVT of FIG. 1.
Figure 4:
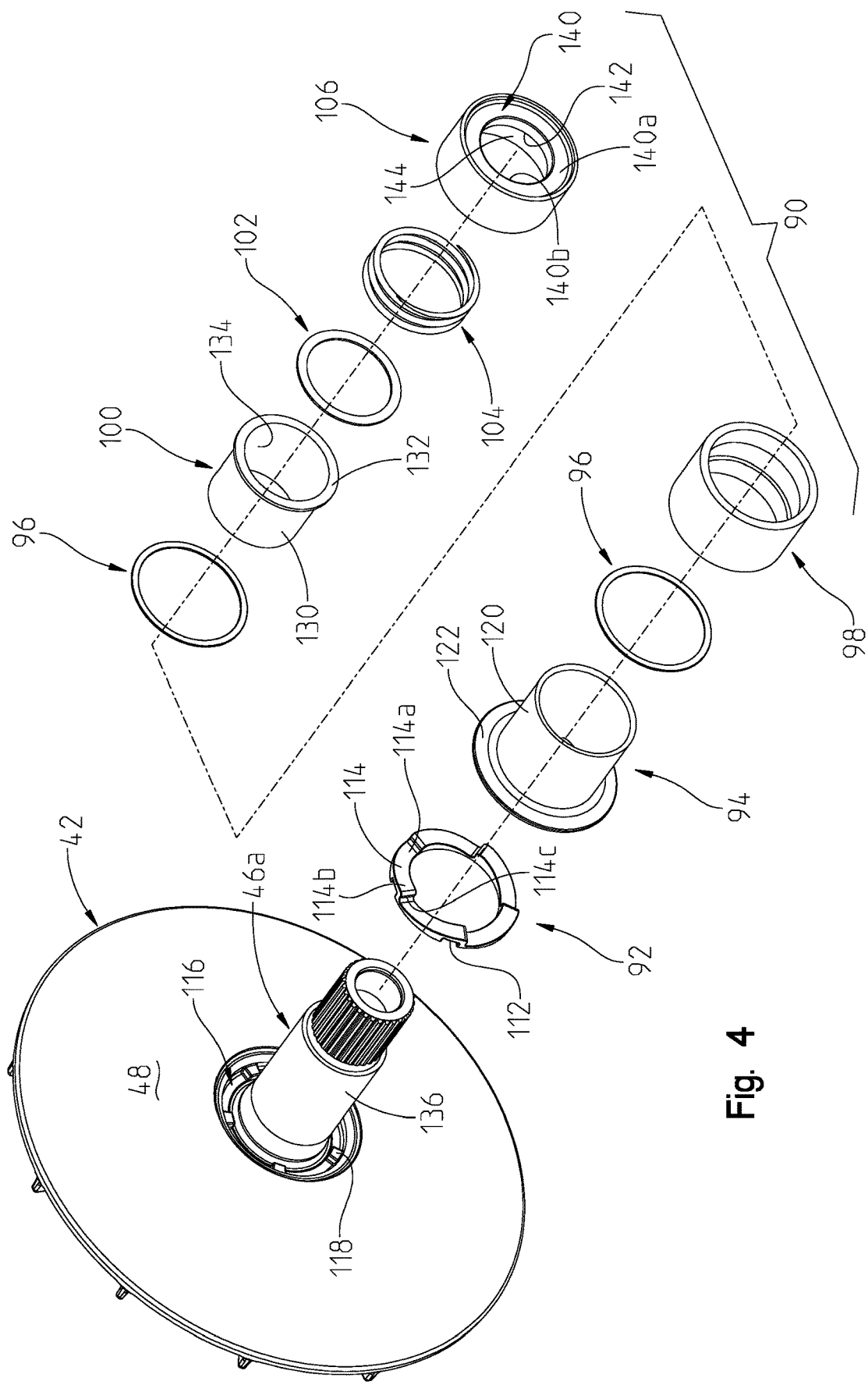
FIG. 4 illustrates an exploded, perspective view of the fixed sheave assembly of FIG. 3.
Figure 5:
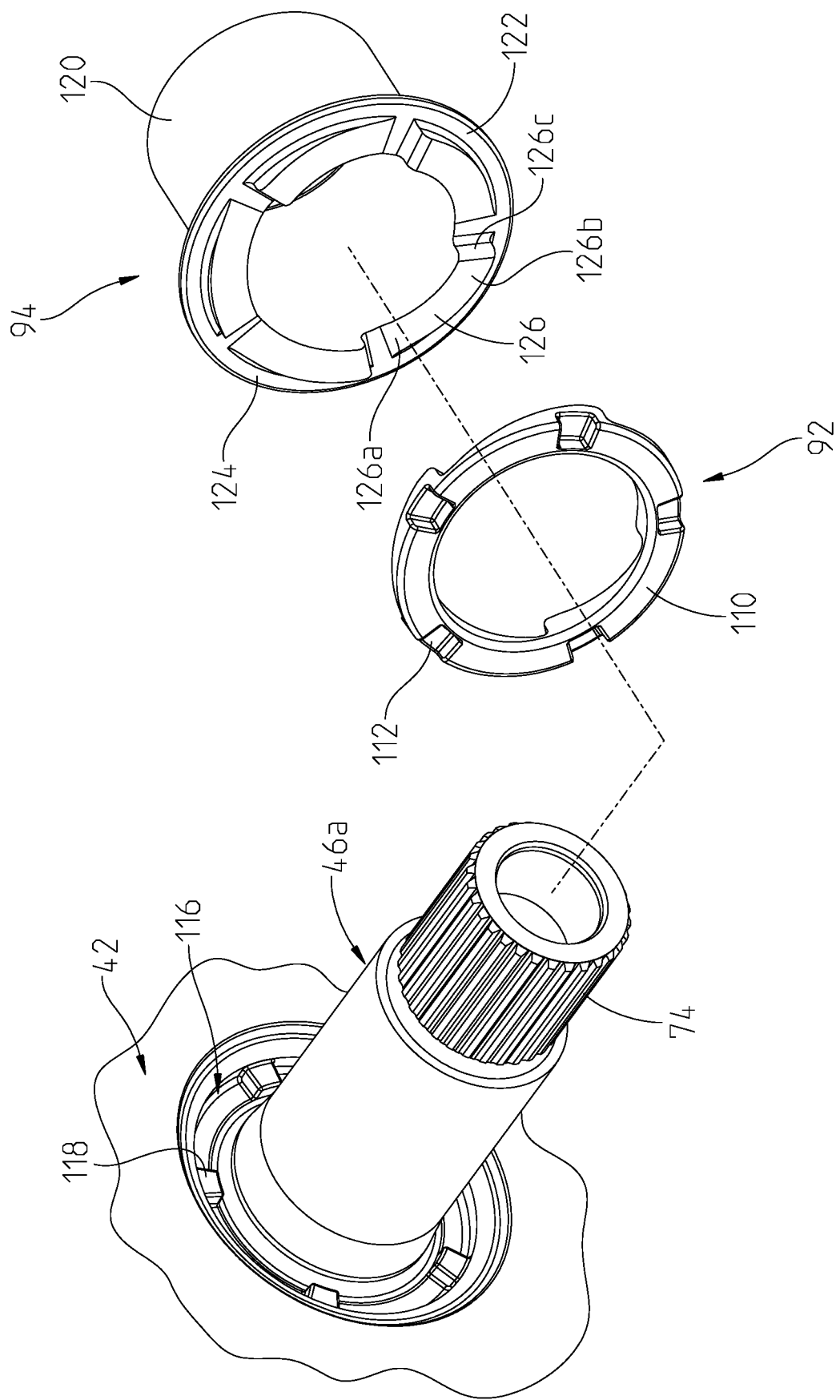
FIG. 5 illustrates a perspective view of the flanged sleeve of the CVT of FIG. 4.

With reference now to FIGS. 3-5, the drive clutch 40 includes a brake assembly 90 positioned over shaft 46 to provide a braking function through the CVT. As shown in FIG. 3, the brake assembly 90 is shown in its complete assembled view over the shaft portion 46a. With reference now to FIG. 4, the brake assembly 90 is shown in an exploded view where the brake assembly is comprised of a thrust plate 92, a flanged sleeve 94, thrust washers 96, a one-way clutch 98, a flanged bearing 100, a thrust ring 102, a compression spring 104 and an outer sleeve at 106.

As shown in FIGS. 4-5, thrust plate 92 includes an inner surface at 110 (FIG. 5) having a plurality of openings at 112 and on the opposite side, a plurality of ramped surfaces 114 (FIG. 4) having a lower-most surface 114a, an upper-most surface 114b thereby defining a stop surface 114c. It should be appreciated that each of the ramped surfaces 114 are designed such that the surface leads up to the upper-most surface 114b whereas the stop surface 114c extends inwardly to the next corresponding lower-most surface 114a. In the embodiment shown, thrust plate 92 is an injection molded component, comprised of a high temperature resin such as a Polyetheretherktone (PEEK).

As shown in FIG. 5, outer sheave 42 includes a recess 116 surrounding shaft portion 46a where recess 116 includes a plurality of lugs 118 which are spaced in radial cooperation with openings 112 on thrust plate 92. Thus, thrust plate 92 may be positioned over shaft portion 46a into the recess 116 whereby the thrust plate 92 is rotated to align the openings 112 with the lugs 118 where it is pressed into place. Although thrust plate 92 need not be fixed in position due to the compression of the braking assembly 90, it could be held into place by known fasteners or adhesives.

With reference still to FIG. 5, flanged sleeve 94 includes a sleeve portion 120 and a flanged portion 122 where flanged portion 122 includes a rear surface at 124 including a plurality of ramped surfaces 126 defining lower-most portions 126a, upper-most portions 126b thereby defining stop surfaces 126c. It should be appreciated that the ramped surfaces 126 of the flanged sleeve 94 cooperate with the ramped surfaces 114 of the thrust plate 92 as further described herein. In the embodiment shown, the flanged sleeve is manufacture from a forged steel and then nickel coated. It should be appreciated that the flanged sleeve 94 is designed such that the manufacturing is easy, as the ramped surfaces 126 are positioned on an end face of the flanged sleeve 94, thereby making those surfaces easy to forge.

One-way clutch 98 could be any rotary-type locking clutch but in the present embodiment, one-way clutch 98 would include a plurality of needle bearings which act as a bearing while rotating in one direction and in the opposite direction will lock to sleeve portion 120 of flanged sleeve 94.

Bearing 100 (FIG. 4) includes a sleeve portion 130 and a flanged portion 132. It should be appreciated that sleeve portion 130 has an inner diameter 134 slightly greater than outer diameter 136 of flange portion 46a such that bearing 100 is slidably receivable over the shaft portion 46a.

Finally, outer collar 106 has a recess 140 at a rear side thereof defining rear face 140a which surrounds an opening at 140b. A second recess 142 is defined internally of the rear collar 106, which defines a forwardly facing surface and a reduced diameter portion at 144.

Figure 6A:
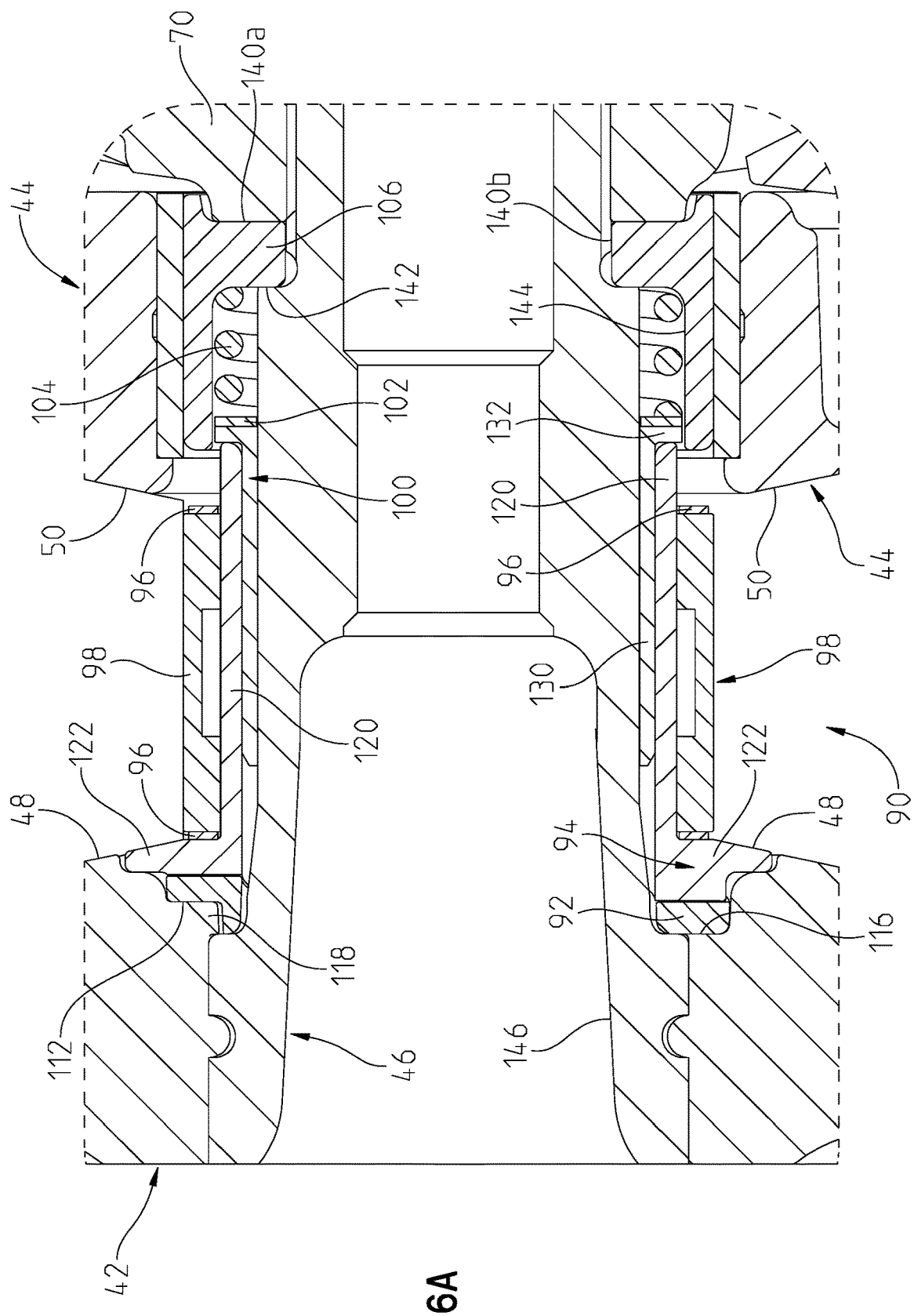
FIG. 6A is an enlarged view of the portion illustrated at 6A in FIG. 6.

With reference now to FIGS. 3, 4 and 6a, the assembly of the braking assembly 90 will be described. With reference first to FIGS. 4 and 6a, the thrust plate 92 is positioned in the recess 116 to align the corresponding openings 112 and lugs 118. The flanged sleeve 94 is then positioned over shaft portion 46a with the flanged portion 122 positioned against the thrust plate 92 with the corresponding ramped surfaces 126 (FIG. 5) aligned with ramped surfaces 114 of thrust plate 92. Inner thrust washer 96 is then positioned against the sleeve portion 122 and the one-way clutch 98 is slidably received over the sleeve portion 120. This is also shown in FIG. 6a. The outer thrust washer 96 is then positioned over the shaft portion 46a, over the sleeve portion 120 and in abutting relationship with the one-way clutch 98 (FIG. 6a).

Bearing 100 is then slidably received between the flanged sleeve 94 and shaft portion 46a with the flanged portion 132 against a free end of the flanged portion 120 (FIG. 6a). Thrust collar 102 is then positioned against flanged portion 132 and compression spring 104 is positioned against the thrust collar 102. Outer sleeve 106 is then positioned over shaft portion 46a such that the inner face 142 abuts the compression spring 104 and the inner diameter 144 overlaps the compression spring 104 (FIG. 6a). This allows the outer housing 70 to abut the outward facing surface 140a as shown in FIG. 6a. The flanged portion 132 is also positioned adjacent to inner surface 144 of outer sleeve 106, which prevents dirt and dust from entering the chamber containing the compression spring 104. As also shown in FIG. 6, the shaft portion 46a includes a tapered portion 146 to receive the end of a crankshaft and shaft portion 46b includes a bore 148 to receive a bolt (not shown) which extends through bore 148 to threadably engage a threaded aperture at the end of the crankshaft. This couples the drive clutch 40 of the CVT 2 to input power.

With reference again to FIG. 6, driven clutch 150 is shown as including inner sheave 152 and outer sheave 154, where the inner sheave and outer sheave 152, 154 are coupled to a shaft 156. Inner sheave 42 includes a sheave surface 158 and outer sheave 44 includes a sheave surface 160. Driven clutch 150 also includes an outer retainer 162 and an inner retainer 164 for retaining compression spring 166. Outer retainer 164 is defined on a helix 168 which will be further described herein with reference to a description of the driven clutch. It should also be appreciated that the inner and outer sheaves 152, 154 of the driven clutch 150 are spring loaded into the closed position of FIG. 6.

Figure 7:
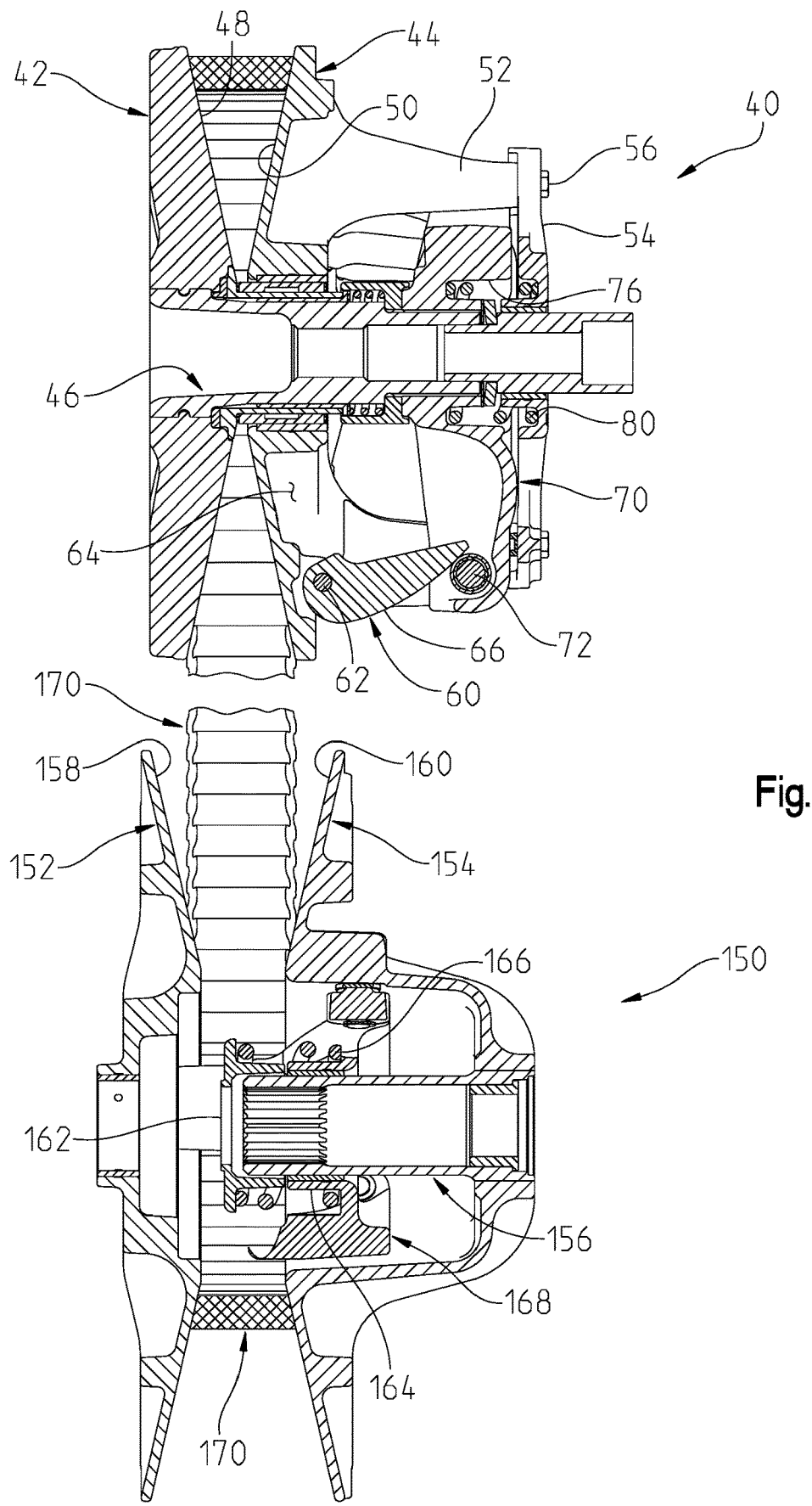
FIG. 7 illustrates a cross sectional view of the drive and driven clutches of the CVT of FIG. 1 at a high vehicle speed.

With reference now to FIGS. 6 and 7, the operation of the drive and driven clutches 40, 150 will be described in greater detail. With reference first to FIG. 6, the drive clutch is shown in a low speed application where a belt 170 is coupled between the drive clutch 40 and the driven clutch 150. As shown in FIG. 6, the drive clutch 40 is shown with sheaves 42, 44 spring loaded to an open position where belt 170 contacts the inner surfaces 48, 50 of the outer 42 and inner 42 sheaves. As also shown in FIG. 6, the driven clutch 150 is shown with sheaves 152, 154 spring loaded to a closed open position where belt 170 contacts the inner surfaces 158, 160 of the outer 152 and inner 154 sheaves. This position of the belt 170 and the spacing of the sheaves 42, 44; 152, 154 correspond with a low speed/high torque application where the output through the driven clutch 150 is substantially slower than the speed of the driven clutch 40.

As the drive clutch is sped up through the drive input through shaft 46, for example by the increased speed of an internal combustion engine, the counterweights 60 begin to rotate in a clockwise sense as viewed in FIG. 6, from a position shown in FIG. 6 to the position shown in FIG. 7. When the counterweights 60 rotate, the cam surface 66 contacts roller 72 and closes outer sheave 44 against the spring load of compression spring 80 such that the belt 170 moves outwardly and the drive clutch 40 and driven clutch 150 move from the position of FIG. 6 to the position shown in FIG. 7. The position of FIG. 7 corresponds to a higher driven output relative to the drive input.

Figure 8:
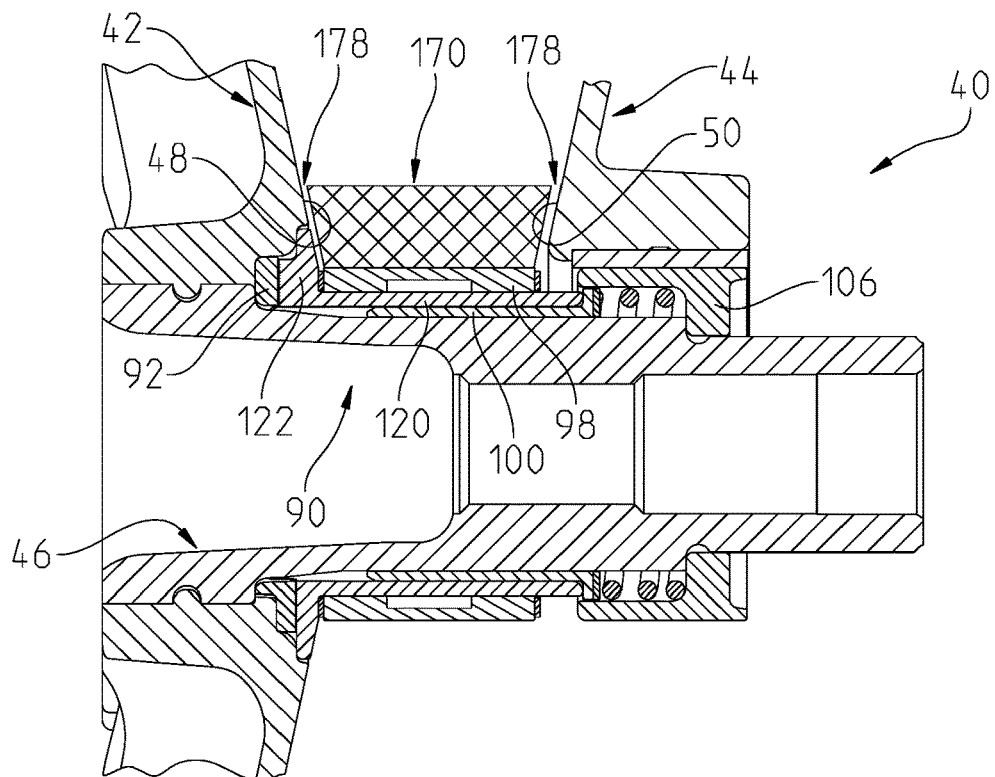
FIG. 8 is a cross-sectional view of the drive clutch illustrating a position of the flanged sleeve a vehicle idle.
Figure 9:
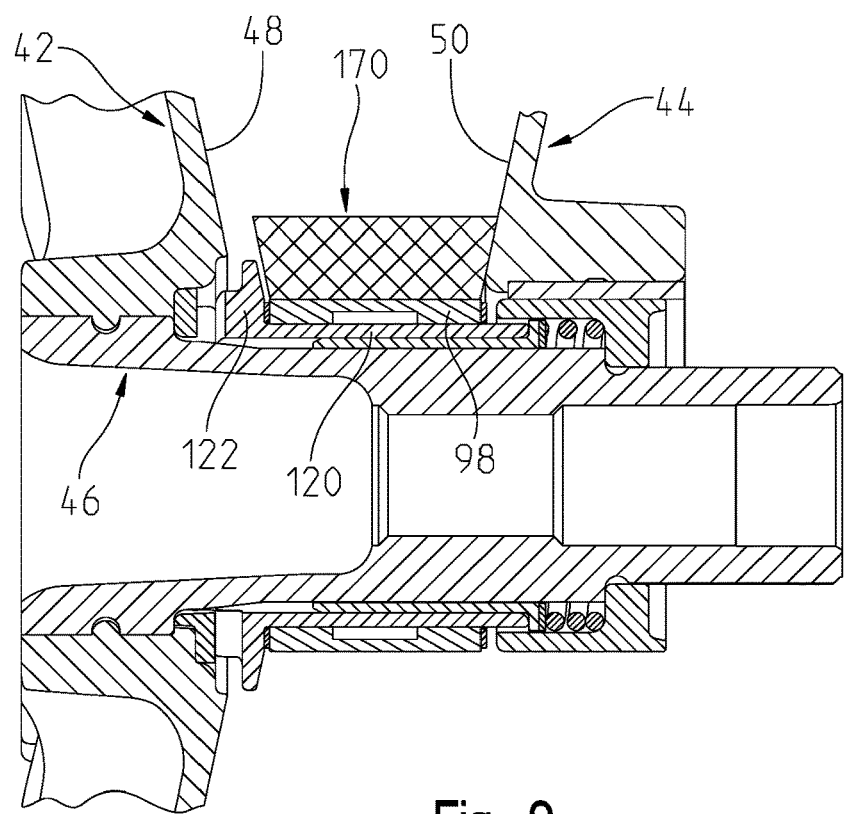
FIG. 9 is a cross-sectional view similar to that of FIG. 8, illustrating the position of the flanged sleeve during counter rotation of the CVT belt.

With reference now to FIGS. 8 and 9, the operation of the braking assembly 90 will be described in greater detail. With reference to FIG. 8, the drive clutch is shown in an idle condition where no torque is transmitted from the belt to the driven clutch 150. In this position, the belt 170 contacts the one way clutch 98, and due to the spacing 178 between the surfaces 48 and 50 and the belt 170, the drive clutch sheaves 42, 44 rotate relative to the belt, while belt remains stationary. That is, shaft 46 rotates relative to the one way clutch 98.

However in the case where a reverse torque is placed on the belt, for example if the engine and clutches are not being driven, and the one way clutch is rotated in the opposite direction, the one way clutch is locked to the flanged sleeve 94. As the flanged sleeve 94 rotates relative to the thrust plate 92, the ramped surfaces 114, 126 (FIGS. 4 and 5) rotate relative to each other and the flanged sleeve is cammed outwardly to the position shown in FIG. 9. In this configuration, the flange portion 122 of flanged sleeve 94 grips the outer edge of the belt 170 while the opposite edge of the belt 170 is pressed against inner surface 50 of inner sheave 44.

Thus in application, if the vehicle is decelerating from a higher speed to a lower speed, the belt would start out in a high position on the sheave (FIG. 7) and then as the vehicle slows down the belt closes in on the center axis of the sheaves 42, 44 until eventually the belt contacts the flanged sleeve 94. That torque will cause the flanged sleeve 94 to translate and that provides engine braking. As soon as there is any torque applied, that torque causes the outer sheave 44 to move. The clamping force required to actuate sleeve 94 is minimized design because the belt 170 wedges between the flange portion 122 and the outer sheave 44 as soon as belt 170 contacts the flanged sleeve 94. The reduction in amount of driven torque helps to reduce the deceleration rate. With this design, there is contact on both sides of the belt. During deceleration, the one-way clutch 98 is not used. The one way clutch 98 is not engaged at all until the belt 170 comes down and contacts the flanged sleeve 94 at idle, during which time the one way clutch 98 is just over running.

Figure 10:
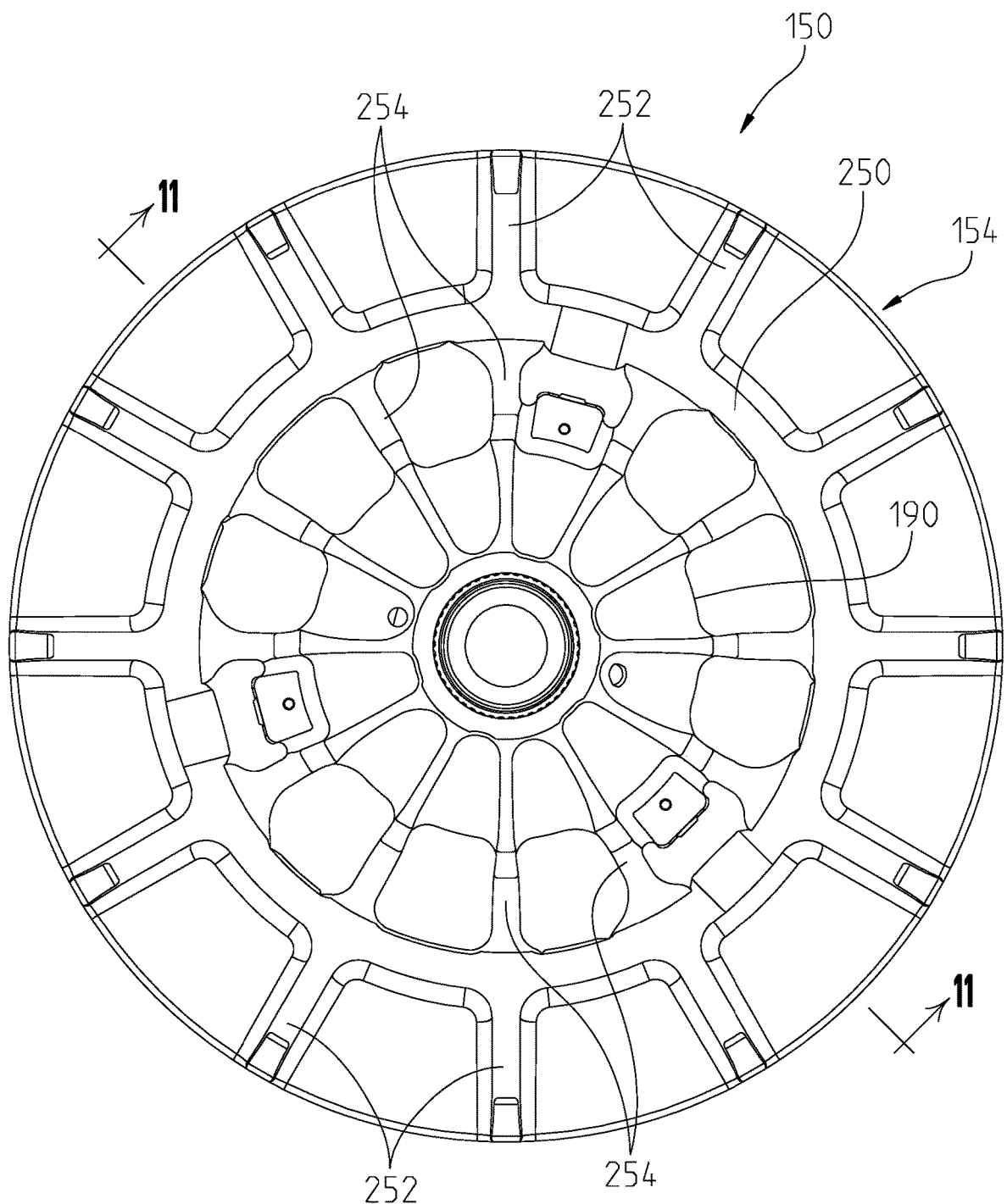
FIG. 10 is a front view of the driven sheave.
Figure 11:
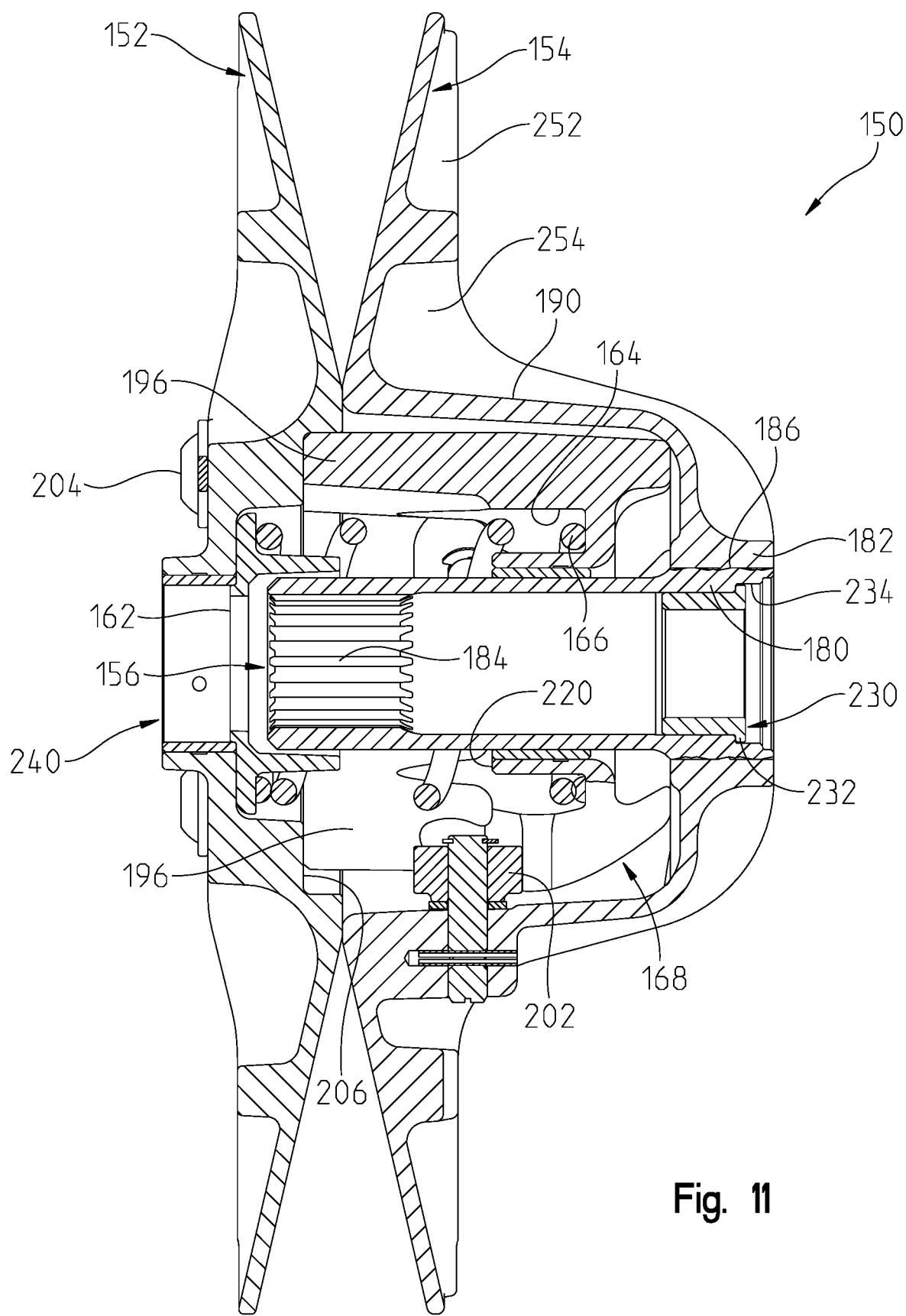
FIG. 11 illustrates a cross sectional view of the driven clutch through lines 11-11 of FIG. 10.

With reference now to FIGS. 10-16, driven clutch 150 will be described in greater detail. With reference first to FIG. 11, driven clutch 150 is shown where driven clutch sheave 154 is coupled to shaft 156 at an interface between an end 180 of shaft 156 and a flange 182 of sheave 154. In the embodiment shown, shaft 156 is manufactured from forged steel to include integrated splines at 184 and a knurled surface 186. Sheave 154 is comprised of cast aluminum which is cast directly to shaft 156 with flange 182 cast directly over the knurled surface 186. Sheave 154 is also cast to include a bell-shaped housing portion 190 which is profiled to receive helix 168 as described herein.

Figure 12:
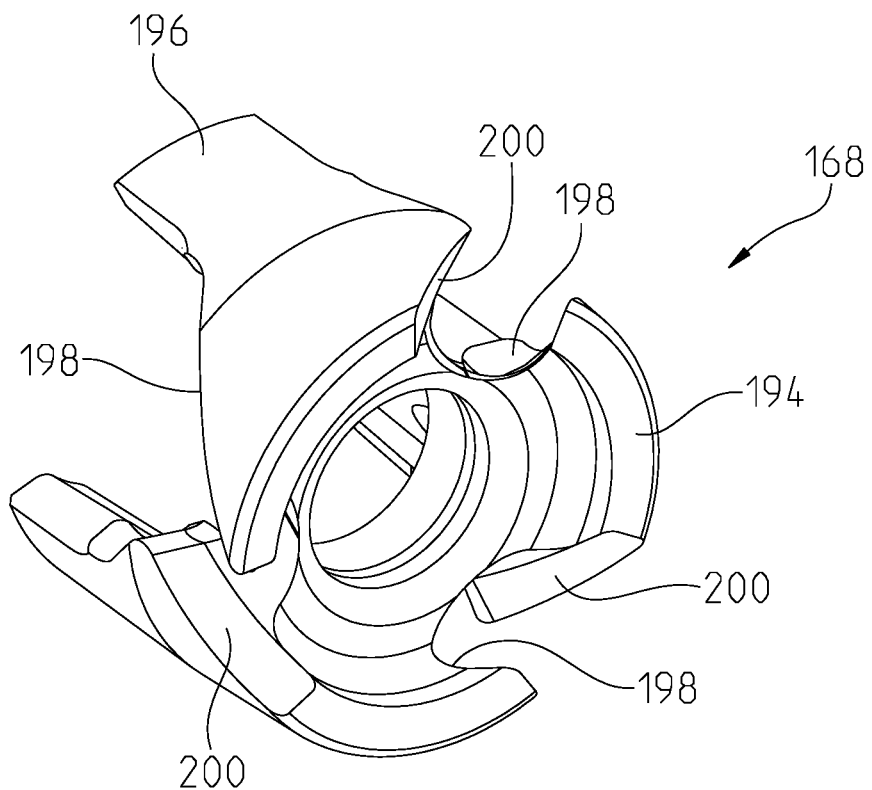
FIG. 12 is a rear perspective view of the helix of the driven clutch.
Figure 13:
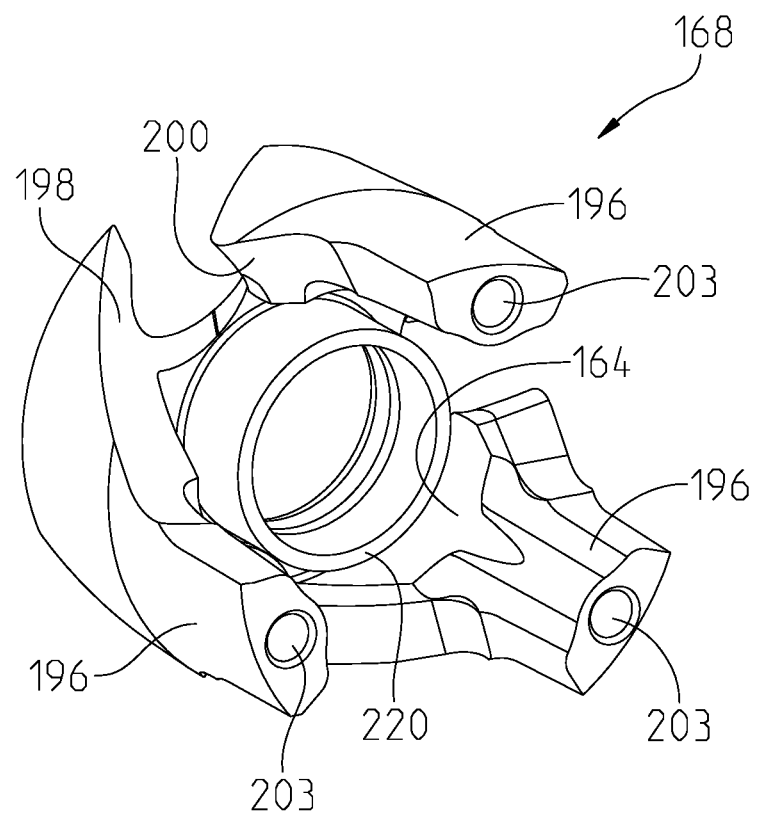
FIG. 13 is a front perspective view of the helix of the driven clutch.
Figure 14:
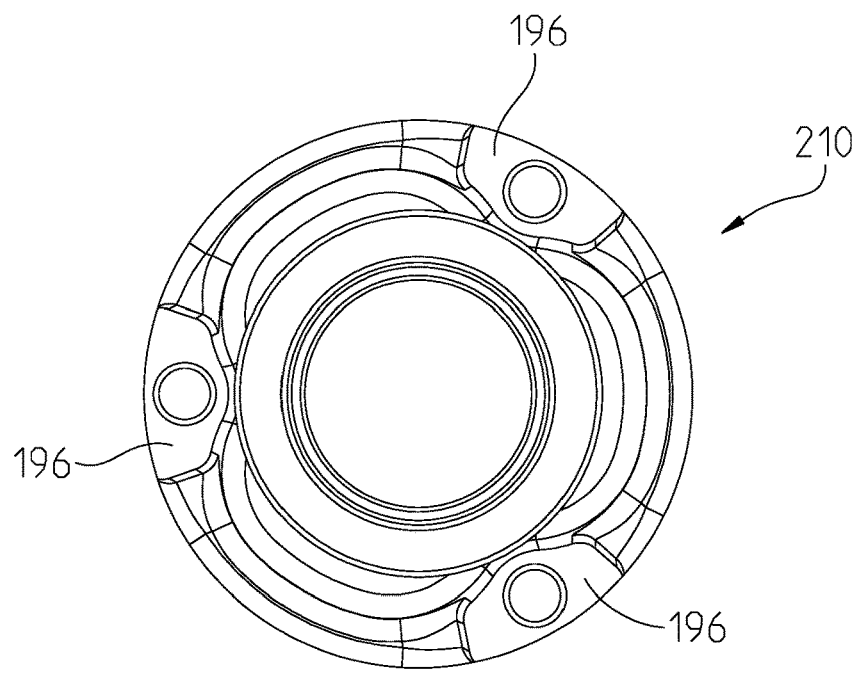
FIG. 14 is a front view of the helix of the driven clutch of FIGS. 12 and 13.
Figure 15:
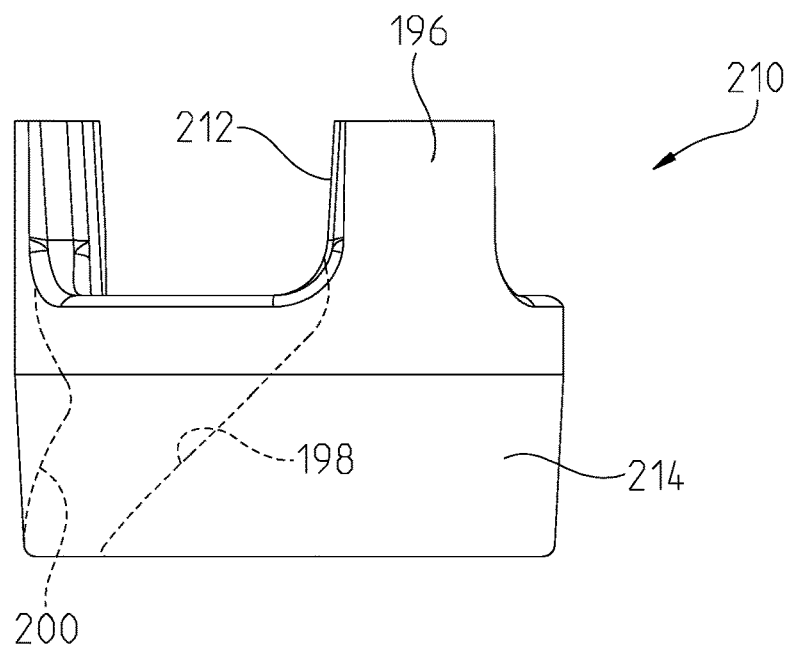
FIG. 15 is a side view of the helix of the driven clutch of FIGS. 12 and 13.

With reference to FIGS. 12 and 13, helix 168 is shown having three leg portions 196 which extend forwardly from an integrated base portion 194 where leg portions 196 include helical surfaces 198, 200 which cooperate with engagement members in the form of rollers 202 (FIG. 11) to effect the movement of sheave portion 154 relative to 152. As disclosed, helix 168 is formed from a forged steel base portion 210 having openings at 212 which define the leg portions 196. With the base portions shown in FIGS. 14 and 15, the side wall 214 is machined to remove metal along the dashed lines to define the surfaces 198 and 200. Helix 168 also includes threaded apertures 203 (FIG. 13), and fasteners 204 couple helix 168 within a recess 206 to the inner sheave 152.

As shown best in FIG. 13, a front edge of retainer 164 includes a stop surface at 220. With reference to FIG. 11, driven clutch 150 further includes a sleeve 230 having a flanged portion 232 which nests within an aperture 234 of shaft 156. Sheave 152 includes a sleeve 240 positioned along a center line thereof and coaxially positioned relative to shaft 156. With reference now to FIG. 10, sheave 154 includes a ring 250 positioned generally coaxially of the sheave 154 and includes a plurality of strengthening ribs 252, 254 which rigidify the bell-shaped housing 190 and the ring 250. The ring 250 may be used to balance the driven clutch 150 by removing material from the ring 250.

Figure 16:
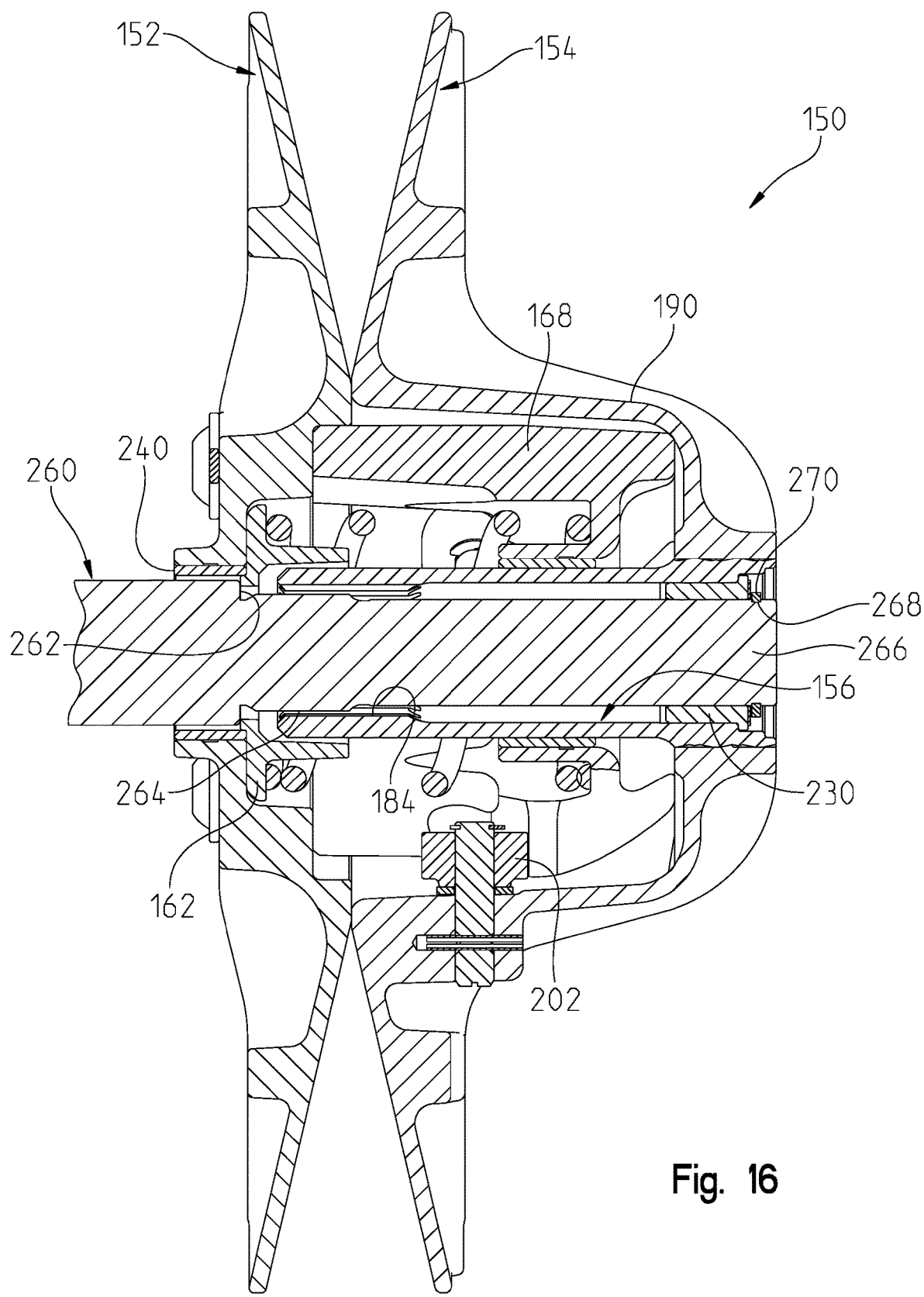
FIG. 16 illustrates a cross sectional view of the driven clutch similar to that of FIG. 11, showing an output shaft coupled to the driven clutch shaft.

With reference now to FIG. 16, driven clutch 150 is shown (in a similar view as FIG. 11) including an output shaft 260 having an edge 262 in abutment with retainer 162; splines 264 in engagement with splines 184; and an outermost end 266 positioned in sleeve 230. Outermost end 266 also includes a groove at 268 to receive a lock ring 270 to retain the shaft 260 in position in the driven clutch 150.

Advantageously, the two piece shaft 46 having portions 46a, 46b allows the CVT to be modified to address other CVT sizes. For example, the shaft 46 allows some of the components to be used with a new outer sheave portion to provide a narrower overall profile.

Also, helix 168 is comprised of a metal dissimilar to the sheaves, that is, it's a non-aluminum helix. By providing a helix design which is forged steel, the helix won't groove out when operating at a constant speed for a lengthy period of time. Also, by having a steel helix as part of a movable sheave, there's heavy mass close to the transmission. As the vehicle upshifts as the vehicle speed increases, the inner sheave where the helix is bolted, moves closer and closer to the transmission, so the design minimizes natural frequency problems.

More particularly, the sheave could be an aluminum grade such as an A380 or B390 having a density of 2.71 gr/cc, whereas the helix is steel having a density of approximately 7.8 g/cc. It should be appreciated that alternate materials to those identified above could be used, and it is the density that allows the advantage. Thus, the driven sheave has a density lower than 4.0 gr/cc, and in the range of 2.0-3.95 gr/cc, and more particularly in the range of 2.5-3.0 gr/cc. Also the helix has a density greater than 4.0 and in the range of 4.05-9.0 gr/cc and more particularly in the range of 7.5-8.5 gr/cc.

The two piece shaft design (156, 260) also provides advantages to the high speed application. When belt clamping loads get high, for example, close to 2000 lbs. of clamp load, there's a big bending moment in it. On existing modular clutch designs, the sheaves come completely apart. The present design includes the shaft portion 156 in the center in order to keep the sheaves stable at high speeds. As the contact points are spread out, it provides less runout in assembly which provides a cooler running CVT. So the cast shaft 156 as part of the sheave becomes the datum structure which provides a very true running sheave with little runout.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A continuously variable transmission (CVT), comprising:
   a drive clutch having inner and outer sheaves rotatably coupled to a drive clutch shaft;
   a driven clutch having inner and outer sheaves rotatably coupled to a driven clutch shaft;
   a one-way clutch;
   a flanged sleeve operatively coupled to the drive clutch shaft and generally positioned intermediate the inner and outer sheaves of the drive clutch, with the one-way clutch positioned over the flanged sleeve, wherein the flanged sleeve is rotatably fixed relative to the drive clutch shaft when operating in a first direction, and wherein the flanged sleeve is moveable axially relative to the drive clutch shaft and moveable towards the outer sheave of the drive clutch when operating in a second direction; and
   a thrust member operative to move the flanged sleeve axially upon rotation of the flanged sleeve in the second direction, wherein the thrust member is a thrust plate positioned adjacent to an inner surface of the inner sheave of the drive clutch.

2. The CVT of claim 1, wherein the flanged sleeve comprises a flange portion and a collar portion, the collar portion being positioned over the drive clutch shaft and the flange portion being positioned adjacent to the inner sheave of the drive clutch.

3. The CVT of claim 2, wherein the inner sheave of the drive clutch includes a recess to receive the flanged sleeve.

4. The CVT of claim 3, wherein the thrust member is positioned in the recess to cooperate with the collar portion to move the flanged sleeve axially upon rotation of the flanged sleeve in the second direction.

5. The CVT of claim 4, further comprising a belt coupled between the drive clutch and the driven clutch, and positioned over the one-way clutch.

6. The CVT of claim 4, wherein the inner and outer sheaves of the drive clutch rotate relative to the one-way clutch when rotating in the first direction.

7. The CVT of claim 6, wherein the flanged sleeve and the thrust member cooperate to move the flanged sleeve axially.

8. The CVT of claim 7, wherein the flanged sleeve and the thrust member include cooperating cams used to move the flanged sleeve axially.

9. The CVT of claim 8, wherein the cooperating cams are rotary cams.

10. The CVT of claim 8, wherein the cooperating cams are on an end face of the flanged sleeve and facing the inner sheave.

11. The CVT of claim 10, wherein the flanged sleeve is comprised of forged steel.

12. The CVT of claim 1, further comprising a bearing positioned between the flanged sleeve and the drive clutch shaft.

13. The CVT of claim 1, wherein the drive clutch shaft is provide in plural pieces.

14. The CVT of claim 1, wherein the thrust member has at least two interactive portions that are spaced apart from each other around a base and interface with the flanged sleeve.

15. The CVT of claim 14, wherein the flanged sleeve includes at least two interactive portions that are spaced apart and interact with the at least two interactive portions of the thrust member.

16. The CVT of claim 15, wherein the at least two interactive portions of the flanged sleeve and the thrust member are ramped surfaces that cooperate with each other to move the flanged sleeve axially.

17. The CVT of claim 14, wherein the flanged sleeve includes at least two interactive portions that interact with the base of the thrust member.

18. The CVT of claim 17, wherein the base of the thrust member includes at least two openings, and wherein the at least two interactive portions of the flanged sleeve are lugs that are spaced in radial cooperation with the at least two openings of the thrust member.

19. A continuously variable transmission (CVT), comprising:
   a drive clutch having inner and outer sheaves rotatably coupled to a drive clutch shaft;
   a driven clutch having inner and outer sheaves rotatably coupled to a driven clutch shaft;
   a thrust member positioned over the drive clutch shaft and adjacent the inner sheave of the drive clutch, the thrust member having at least two interactive portions that are spaced apart from each other around a base, and the base including at least two openings; and
   a flanged sleeve operatively coupled to the drive clutch shaft and generally positioned intermediate the inner and outer sheaves of the drive clutch, with a portion of the flanged sleeve being adjacent the thrust member, the flanged sleeve including at least two interactive portions that interact with the base of the thrust member, the at least two interactive portions of the flanged sleeve being lugs that are spaced in radial cooperation with the at least two openings of the thrust member, wherein the flanged sleeve is rotatably fixed relative to the drive clutch shaft when operating in a first direction and is cooperable with the thrust member to move the flanged sleeve axially relative to the drive clutch shaft and towards the outer sheave when operating in a second direction and wherein the at least two interactive portions of the thrust member interface with the flanged sleeve.

20. The CVT of claim 19, wherein the flanged sleeve comprises a flange portion and a collar portion, the collar portion being positioned over the drive clutch shaft and the flange portion being positioned adjacent to the inner sheave of the drive clutch.

21. The CVT of claim 20, wherein the inner sheave of the drive clutch includes a recess to receive the flanged sleeve.

22. The CVT of claim 21, further comprising a one-way clutch positioned over the collar portion of the flanged sleeve.

23. The CVT of claim 22, wherein the thrust member is positioned in the recess to cooperate with the collar portion to move the flanged sleeve axially upon rotation of the flanged sleeve in the second direction.

24. The CVT of claim 23, further comprising a belt coupled between the drive clutch and the driven clutch, and positioned over the one-way clutch.

25. The CVT of claim 23, wherein the inner and outer sheaves of the drive clutch rotate relative to the one-way clutch when rotating in the first direction.

26. The CVT of claim 25, wherein the flanged sleeve and the thrust member include cooperating cams to move the flanged sleeve axially.

27. The CVT of claim 26, wherein the cooperating cams are rotary cams.

28. The CVT of claim 26, wherein the cooperating cams are on an end face of the flanged sleeve and facing the inner sheave.

29. The CVT of claim 28, wherein the flanged sleeve is comprised of forged steel.

30. The CVT of claim 28, further comprising a bearing positioned between the flanged sleeve and the drive clutch shaft.

* * * * *